(12) United States Patent
Williams

(10) Patent No.: US 6,989,650 B2
(45) Date of Patent: Jan. 24, 2006

(54) AC MOTOR CONTROL SYSTEM USING PARALLEL INTEGRATED SUB SYSTEMS

(75) Inventor: Kevin R. Williams, Cypress, TX (US)

(73) Assignee: Oilfield-Electric-Marine, Inc., Houston, TX (US)

( * ) Notice: Subject to any disclaimer, the term of this patent is extended or adjusted under 35 U.S.C. 154(b) by 0 days.

(21) Appl. No.: 10/660,084

(22) Filed: Sep. 11, 2003

(65) Prior Publication Data

US 2005/0057213 A1 Mar. 17, 2005

(51) Int. Cl.
H02P 5/28 (2006.01)
H02P 5/34 (2006.01)
H02P 5/38 (2006.01)
H02P 5/408 (2006.01)
H02P 7/36 (2006.01)

(52) U.S. Cl. .................. 318/811; 318/599; 318/727; 318/801; 318/255

(58) Field of Classification Search ............. 318/811, 318/801, 599, 727, 255, 254, 606, 684, 93–95
See application file for complete search history.

(56) References Cited

U.S. PATENT DOCUMENTS

| | | | | |
|---|---|---|---|---|
| 3,967,173 A | * | 6/1976 | Stich | 318/811 |
| 4,099,109 A | * | 7/1978 | Abbondanti | 318/811 |
| 4,164,785 A | * | 8/1979 | Young et al. | 363/50 |
| 4,491,778 A | * | 1/1985 | Knox et al. | 318/803 |
| 4,736,148 A | * | 4/1988 | Hirata | 318/812 |
| 4,879,639 A | * | 11/1989 | Tsukahara | 363/37 |
| 5,170,105 A | * | 12/1992 | Kumar | 318/362 |
| 5,638,263 A | * | 6/1997 | Opal et al. | 363/65 |
| 5,668,707 A | * | 9/1997 | Barrett | 363/44 |
| 5,712,540 A | * | 1/1998 | Toda et al. | 318/46 |
| 5,844,397 A | * | 12/1998 | Konecny et al. | 318/811 |
| 5,909,098 A | | 6/1999 | Konecny et al. | 318/811 |
| 5,909,367 A | * | 6/1999 | Change | 363/163 |
| 6,020,726 A | * | 2/2000 | James | 323/239 |
| 6,208,111 B1 | | 3/2001 | Williams | 318/778 |
| 6,229,722 B1 | * | 5/2001 | Ichikawa et al. | 363/71 |
| 6,469,469 B1 | * | 10/2002 | Chambers et al. | 318/801 |
| 6,492,790 B2 | * | 12/2002 | Yoshikawa et al. | 318/727 |
| 2002/0177929 A1 | * | 11/2002 | Kumar | 701/19 |
| 2003/0198065 A1 | * | 10/2003 | Hayashi et al. | 363/35 |

FOREIGN PATENT DOCUMENTS

JP      10066372 A    *  3/1998

* cited by examiner

Primary Examiner—David Martin
Assistant Examiner—Renata McCloud
(74) Attorney, Agent, or Firm—Locke Liddell & Sapp LLP

(57) ABSTRACT

A control system for a polyphase AC motor having a predetermined horsepower rating is provided comprising a plurality of integrated control systems each rated at less than the hoursepower rating for the motor and having a rectifier section, an inverter section, and a controller section, and a parallel controller interfaced to each integrated control system.

20 Claims, 3 Drawing Sheets

AC MOTOR CONTROL SYSTEM USING PARALLEL INTEGRATED SUB SYSTEMS

BACKGROUND OF THE INVENTION

1. Field of the Invention

This invention relates generally to variable frequency AC drive units and more specifically to a control system for an AC motor comprising parallel integrated variable frequency drive units.

2. Description of the Prior Art

Alternating current, or AC, motors provide much of the motive force for industry. AC motors come in a variety of styles and horsepower ratings, from fractional horsepower ratings to multiple thousands of horsepower. Control of industrial AC motors can be quite complex and typically involves more than merely starting and stopping the motor. An AC motor control system typically has to adjust the speed and torque of the motor(s) during normal operation and start-stop cycles.

AC motors may be classed as low, medium and high voltage. Medium-voltage motors consume voltages from about 400V up to about 15 kV and generate power levels up to about 20,000 Hp. For AC motor applications above about 400 Hp, it is typical in the industry to engineer a modular control system for the specific application at hand. One engineering technique used for these high end systems involves paralleling specially designed power modules (such as, rectifier, bus and inverter sections). Paralleling power modules allows flexibility in designing drive systems using a small number of available modules. A control interface specifically designed to interface with parallel power modules is used in such systems Parallel power module control systems for medium-voltage motors are inherently pensive, owing to the amount of design engineering required to configure the system, the need for many system components and the number of system interconnections (such as, wires, bus bars etc.). This design approach for high power, medium voltage control systems leads to high cost. The sophisticated and technical nature of these medium-voltage, high power control systems restrict their use to highly specialized applications.

In contrast, low voltage AC motors typically consume between about 240V and 600V and generate power levels up to about 800 Hp. Control systems for these low-voltage motors have become compact, integrated, and are produced in reasonably high volume. These "integrated" control systems are inherently less expensive than the complex, engineered systems previously mentioned.

SUMMARY OF THE INVENTION

A control system for an AC motor having a predetermined horsepower rating is provided. A plurality of integrated AC motor control systems are used, each of which comprises a rectifier section, an inverter section and a controller section. Each integrated control system has a horsepower rating less that the AC motor to be controlled. A polyphase AC input is applied to the rectifier section of each integrated control system and a polyphase, variable frequency, pulse-width-modulated output is derived from the inverter section of each integrated control system. A parallel controller interfaces with each integrated control system controller to provide a control system for an AC motor.

A method of controlling an AC motor of predetermined horsepower is also provided. The method involves providing a plurality of integrated AC motor control systems each having a horsepower rating less that the AC motor to be controlled. Further, each integrated control systems comprises a rectifier section, an inverter section and a controller section. Polyphase AC power is input to the rectifier section of each integrated control system. A polyphase, variable frequency, pulse-width-modulated power output from the output inverter sections of each integrated control system is generated and a parallel controller that has been interfaced with each integrated control system control provides control of the AC motor.

BRIEF DESCRIPTION OF THE DRAWINGS

The objects, advantages and features of the invention will be apparent to those of ordinary skill in the art by reference to the Description of Illustrative Embodiments and to the drawings appended hereto, of which.

DESCRIPTION OF ILLUSTRATIVE EMBODIMENTS

State-of-the-art, three-phase AC motors use a sophisticated combination of solid state electronics, magnetic and/or vacuum contactors and other components configured into a control system. Such control systems typically comprise four basic sections: (1) a input rectifier section that rectifies or converts incoming AC power into DC power; (2) a DC bus section that may also filter and condition the DC power; (3) an inverter section that converts the DC power into a pulse width modulated (PWM), variable-frequency AC signal; and (4) a control interface that allows a user to manipulate the control system and, therefore, the AC motor.

Figure 1:
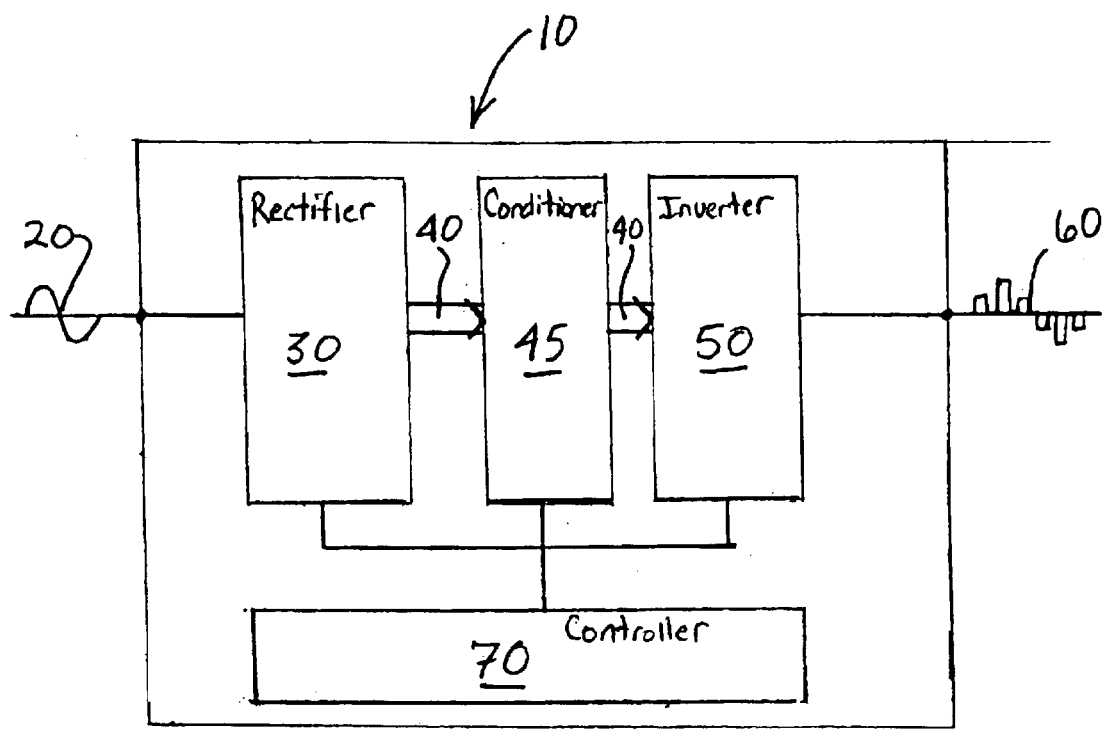
FIG. 1 illustrates an integrated control system for a low voltage AC motor.

FIG. 1 illustrates a conventional integrated control system 10 for a low voltage AC motor (not shown). Three phase AC power 20 is supplied to the integrated control system 10 at the input rectifier section 30. The input rectifier section 30 rectifies or converts the incoming AC power into a form of direct current (DC) power. The DC power is then conducted along a DC bus 40 and also may be filtered 45 or otherwise conditioned as is known in the art. The DC power is passed to the output inverter section 50, which inverts or converts the DC power into variable frequency, pulse-width-modulated AC power 60. A master rectifier/inverter interface controller 70, typically, but not necessarily microprocessor-based, interfaces with the rectifier/bus/inverter system to control the AC motor, such as starting, stopping, and adjusting the speed and/or torque. An example of a conventional integrated control system is the, OEMV3000 AC Variable Speed Drive in the MicroCubicle, or chassis, format offered by Oilfield-Electric-Marine, Inc. and designed for AC Motors up to 315 kW.

Figure 2:
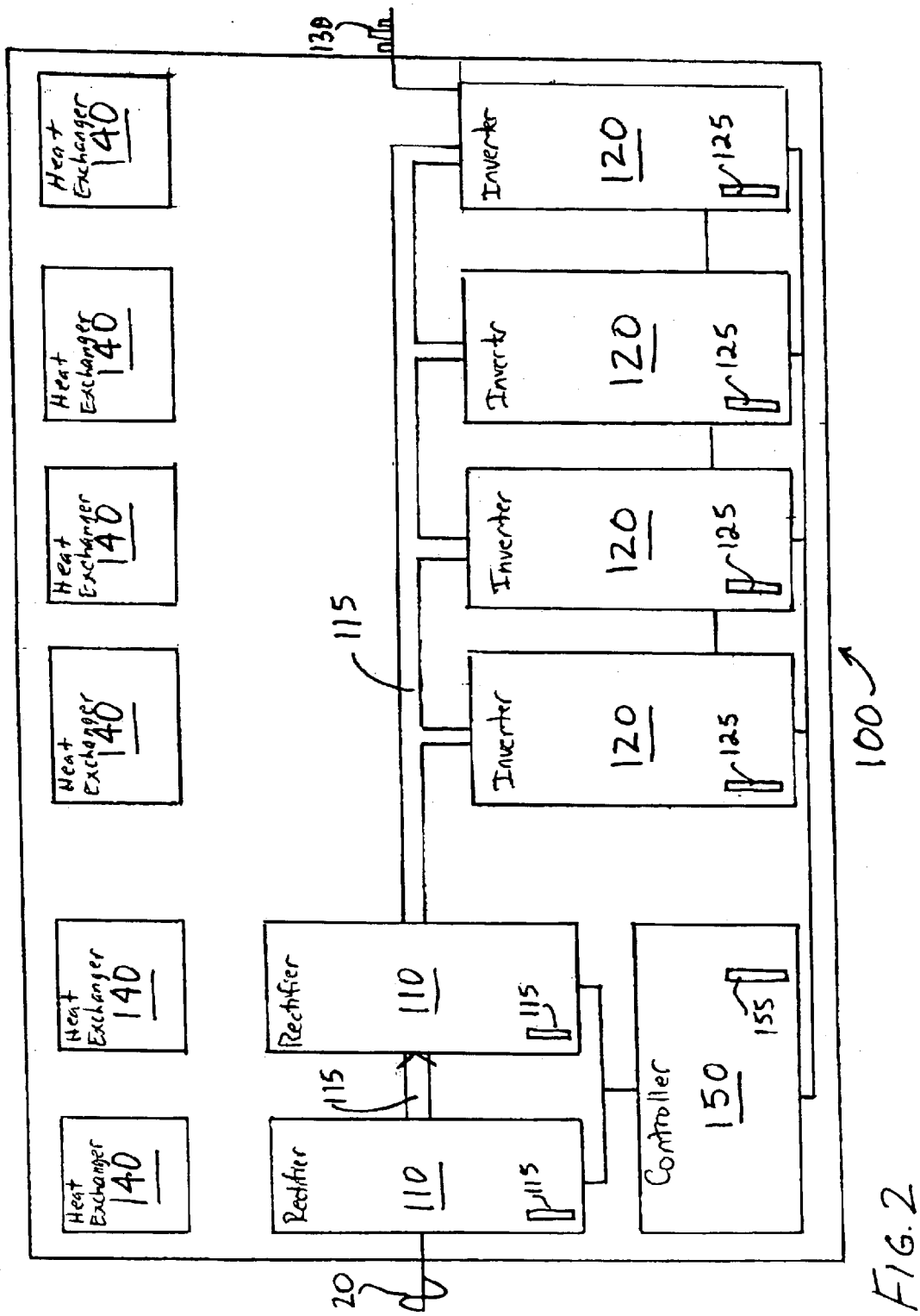
FIG. 2 illustrates a modular control system for a medium voltage AC motor.

FIG. 2 illustrates a modular, as opposed to integrated, AC motor control system for a medium voltage, high horsepower application. The control system 100 is comprised of a plurality of rectifier modules 110 for converting the incoming AC power 20 into a DC analog. The DC power is fed by an internal bus 115 to a plurality of inverter modules 120, which together supply a three phase, variable frequency, pulse-width-modulated AC power signal 130 to the AC motor or motors (not shown). Each rectifier module 110 typically has a rectifier interface card 117 that interfaces the rectifier module to the rest of the system 100. Likewise, each inverter module 120 typically has an inverter interface card 125 that interfaces the inverter module to the rest of the system 100. Each rectifier module 110 and inverter module 120 typically has an associated heat exchanger 140 or other cooling device. Typically these cooling devices 140 use air or liquid as the cooling fluid. Modular control system 100 has an associated parallel controller 150 providing parallel control of the plurality of inverters and rectifiers. Parallel controller 150 typically has a master rectifier/inverter controller section or card 155 that communicates and interfaces with the rectifier interface 117 and inverter interface 125. It will be understood by those of skill in the art that reference to "cards" is merely one example of how conventional drives are organized and is not meant to limit the application of the present invention to other drive structures and designs. An example of a conventional modular control system is the OEMV3000 AC Variable Speed Drive in the Delta format offered by Oilfield-Electric-Marine, Inc. and designed for AC Motors over 315 kW, for example, a 600 kW (800 Hp) AC motor.

Figure 3:
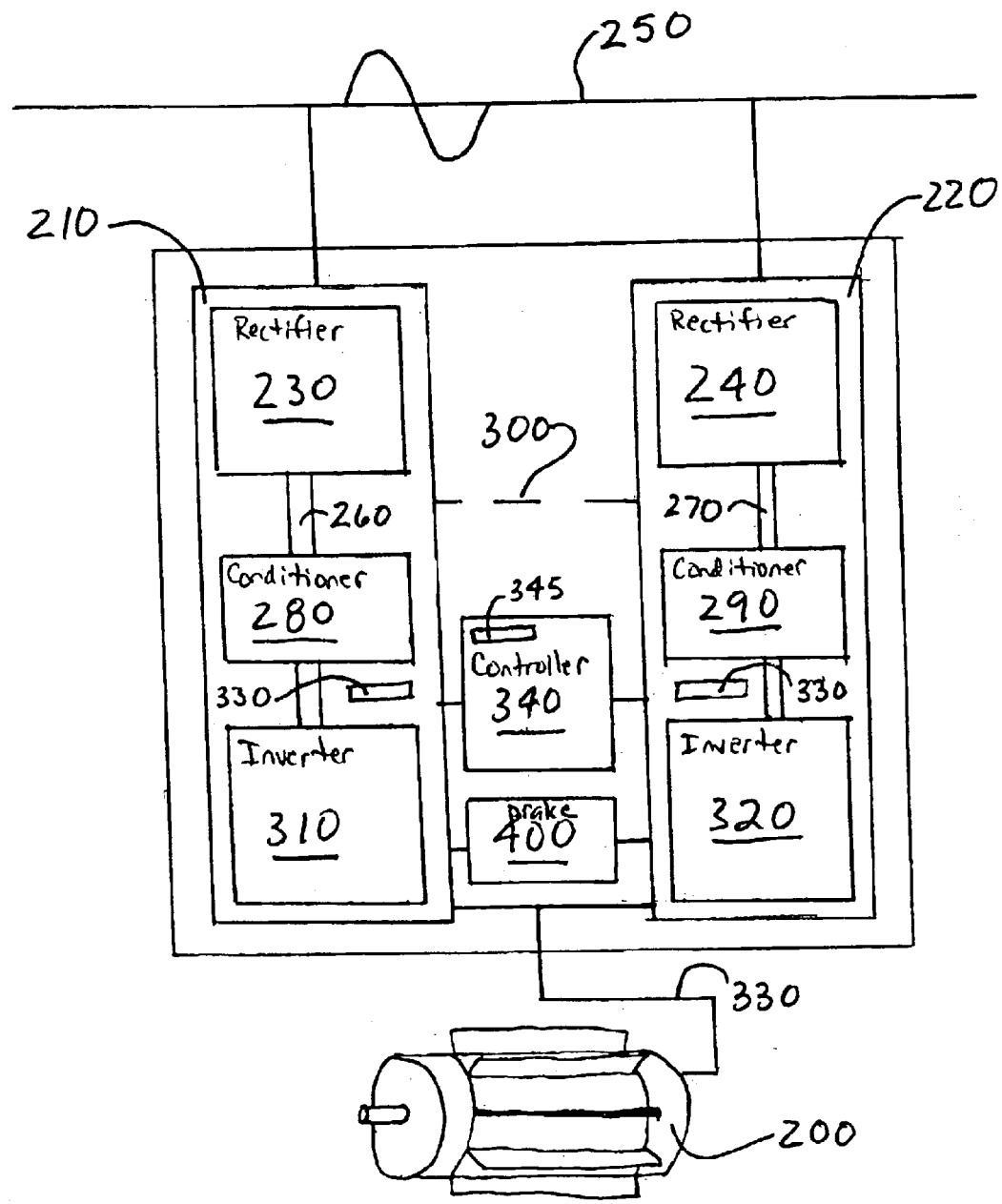
FIG. 3 illustrates an embodiment of the present invention in which a plurality of integrated control systems are controlled in parallel to create a control system for a medium voltage AC motor.

FIG. 3 illustrates one embodiment of the present invention for an 800 Hp AC motor 200. Rather than engineer a modular control system for the 800 Hp motor, such as that shown in FIG. 2, the present invention utilizes a plurality of off-the-shelf, integrated control systems rated for 400 Hp motors, 210 and 220, respectively. In the specific embodiment illustrated in FIG. 3, two 400 Hp integrated control systems, 210 and 220, are connected at their rectifier sections, 230 and 240, to a common, three phase AC power source 250. In the preferred embodiment of the invention illustrated in FIG. 3, the internal DC bus, 260 and 270, and any associated filters or conditioners 280 and 290, of each integrated control system, 210 and 220, remain separate one from the other. In an alternate embodiment, the internal DC buses, 260 and 270, of each integrated control system are connected to a common DC bus 300. The output from the inverter sections 310 and 320 of each integrated control system are connected together to create a three phase, variable frequency, pulse-width modulated, AC power signal 330. Also shown in FIG. 3 is a controller 340, which may be similar to the parallel controller 150 shown in FIG. 2, and includes a similar master rectifier/inverter controller section 345. Controller 340 interfaces with each integrated control system, 210 and 220, and allows user control of the parallel, integrated control systems.

More specifically, the rectifier/inverter interface card 330 common to the integrated controllers is modified or even discarded and replaced with an interface card like those found in the modular systems, one of which is illustrated in FIG. 2. In this fashion, a plurality of independent, integrated drives are paralleled to control a motor having an Hp rating greater than the Hp rating of the individual drives. The present invention can control 2 or more integrated drives in parallel, typically 3 to 8 drives. Moreover, the present invention may incorporate other conventional functionality, including but not limited to, dynamic brake systems or chopper circuits 400. As shown in FIG. 3, chopper circuit 400 may be common to the plurality of integrated drives or each drive may have its own chopper circuit. Additionally, the brake system may be intelligent or may be controlled by the drive controller 340.

Other embodiments of the present invention can be constructed using the teachings set forth above. For example and without limitation, parallel integrated control systems can be constructed for medium voltage, high horsepower applications, which heretofore required an expensive and heavily engineered modular control system. Parallel integrated control systems made according to the present invention will enjoy one or more of the following advantages: the ability to start, control the speed of and stop a polyphase AC motor with paralleled, standard off the shelf integrated variable frequency drive units; utilization of off-the-shelf integrated drive units (each of which contains its own rectifier, inverter and controller), which are inherently less expensive than the complex modular systems currently used; creating a greater variety of variable frequency drive units across a larger horsepower range than is currently available; minimizing the number of components, engineering time and the number of system interconnections (wires, bus bars etc.) used in designing parallel systems thereby decreasing the complexity of the system; decreasing the overall cost for the control system and the requirement of the end user to stock expensive replacement parts; and providing a smaller, more powerful integrated control system drive unit than is currently commercially available.

What is claimed is:

1. A control system for an AC motor having a predetermined horsepower rating, comprising:
   a plurality of integrated AC motor control systems each of which having a horsepower rating less than the AC motor to be controlled, each of said integrated systems comprising an input rectifier section, a DC bus section, an output inverter section and a controller section;
   a 3 phase AC input communicating with the rectifier section of each integrated control system;
   a DC bus communicating with the DC bus section of each integrated control system;
   a 3 phase, variable frequency, pulse-width-modulated output communicating with the output inverter section of each integrated control system; and
   a parallel controller interfaced with each integrated control system controller.

2. A method of controlling an AC motor of predetermined horsepower, comprising:
   providing a plurality of integrated AC motor control systems each having a horsepower rating less than the AC motor to be controlled and each of said integrated control systems comprising an input rectifier section, a DC bus section, an output inverter section and a controller section;
   applying a 3 phase AC input to the rectifier section of each integrated control system;
   supplying a DC bus for the DC bus section of each integrated control system;
   generating a 3 phase, variable frequency, pulse-width-modulated output from the output inverter sections of each integrated control system; and
   controlling the AC motor with a parallel controller interfaced with each integrated control system controller.

3. A control system for a polyphase AC motor having a predetermined horsepower rating, comprising:
   two or more integrated AC motor controllers, each integrated controller having a horsepower rating less than the horsepower rating of the AC motor to be controlled, each integrated controller comprising a rectifier section, an inverter section and a controller section;
   the rectifier section of each integrated controller being supplied with polyphase AC power;

the inverter section of each integrated controller generating a polyphase, variable frequency, pulse-width-modulated power output; and a parallel controller communicating with and controlling each integrated controller to thereby control the AC motor.

4. The control system of claim 3, wherein the motor is rated at 800 horsepower or greater.

5. The control system of claim 3, wherein each integrated controller is rated for 400 horsepower or less.

6. The control system of claim 3, wherein the number of integrated controllers is 3 to 8.

7. The control system of claim 3, further comprising a dynamic brake.

8. The control system of claim 7, wherein the dynamic brake is a chopper circuit.

9. The control system of claim 7, wherein the dynamic brake is intelligent.

10. The control system of claim 7, wherein the dynamic brake is controlled by the parallel controller.

11. The control system of claim 3, further comprising a conditioning section.

12. A method of controlling an AC motor of predetermined horsepower, comprising:

providing a plurality of integrated AC motor control systems each having a horsepower rating less that the AC motor to be controlled and each of the integrated control systems comprising a rectifier section, an inverter section and a controller section;

supplying polyphase AC power to the rectifier section of each integrated control systems;

generating a polyphase, variable frequency, pulse-width-modulated power signal from the inverter sections of each integrated control system;

interfacing a parallel controller with each integrated control system; and controlling each integrated control system with the parallel controller to thereby control the AC motor.

13. The method of claim 12, wherein the motor is rated at 800 horsepower or greater.

14. The method of claim 12, wherein each integrated control system is rated for 400 horsepower or less.

15. The method of claim 12, wherein 3 to 8 integrated control systems are provided.

16. The method of claim 12, further comprising: providing a dynamic brake.

17. The method of claim 16, wherein the dynamic brake is a chopper circuit.

18. The method of claim 16, wherein the dynamic brake is intelligent.

19. The method of claim 16, further comprising: controlling the dynamic brake with the parallel controller.

20. The method of claim 12 further comprising: providing a conditioning section.

* * * * *

UNITED STATES PATENT AND TRADEMARK OFFICE
CERTIFICATE OF CORRECTION

PATENT NO.    : 6,989,650 B2
DATED         : January 24, 2006
INVENTOR(S)   : Kevin R. Williams It is certified that error appears in the above-identified patent and that said Letters Patent is hereby corrected as shown below:

Column 5,
Line 1, delete "inventer" and insert -- inverter --.

Column 6,
Line 2, delete "systems" and insert -- system --.

Signed and Sealed this

Sixteenth Day of May, 2006

JON W. DUDAS
*Director of the United States Patent and Trademark Office*